(12) United States Patent
Ogden

(10) Patent No.: US 6,892,615 B1
(45) Date of Patent: May 17, 2005

(54) FRAME SAW APPARATUS AND METHOD

(76) Inventor: Karl Ogden, 12209 Pine Valley Club Dr., Charlotte, NC (US) 28277

(*) Notice: Subject to any disclaimer, the term of this patent is extended or adjusted under 35 U.S.C. 154(b) by 0 days.

(21) Appl. No.: 10/626,039

(22) Filed: Jul. 24, 2003

Related U.S. Application Data

(62) Division of application No. 10/068,122, filed on Feb. 5, 2002, now Pat. No. 6,698,327.

(51) Int. Cl.[7] .............................. B27B 3/04; B27B 3/18; B26D 1/30
(52) U.S. Cl. .............................. 83/34; 83/754; 83/779; 83/783; 83/556; 83/602
(58) Field of Search .......................... 83/34, 753–755, 83/783–784, 777, 779, 780, 74–75, 556, 83/602, 304, 646, 647, 647.5, 644, 628, 697

(56) References Cited

U.S. PATENT DOCUMENTS

| 267,449 A | 11/1882 | Nixon |
|---|---|---|
| 3,213,909 A * | 10/1965 | Kivimaa .................... 83/777 |
| 3,322,170 A | 5/1967 | Persson |
| 3,921,489 A | 11/1975 | Johansson |
| 4,080,858 A | 3/1978 | Stolzer |
| 4,253,365 A | 3/1981 | Ragazzini |
| 4,287,800 A | 9/1981 | Persson |
| 4,305,318 A | 12/1981 | Stolzer |
| 4,308,852 A | 1/1982 | Gebhart |
| 4,359,921 A | 11/1982 | Stolzer |
| 4,359,922 A | 11/1982 | Stolzer |
| 4,558,614 A | 12/1985 | Harris |
| 4,579,026 A | 4/1986 | Tsune |
| 5,863,358 A | 1/1999 | Krzysztalowicz |

FOREIGN PATENT DOCUMENTS

| DE | 3828431 | * 3/1990 |
|---|---|---|
| EP | 0 512 979 B1 | 11/1992 |
| EP | 0 658 389 A1 | 6/1995 |
| WO | WO-96/35559 | * 11/1996 |

* cited by examiner

Primary Examiner—Stephen Choi
(74) Attorney, Agent, or Firm—Adams Evans P.A.

(57) ABSTRACT

A frame saw for sawing a relatively thick piece of wooden feed stock simultaneously into a plurality of thinner pieces of wood, and including a feed assembly for continuously feeding the stock from an upstream input position to a downstream output position, and a plurality of closely spaced-apart parallel reciprocable saw blades positioned intermediate the input position and the output position for sawing the stock into thinner pieces of stock as the stock is moved by the feed assembly relative to the blades. A drive assembly is operatively connected to the blades for driving the blades in a reciprocating motion comprising alternate cutting and non-cutting strokes. A linear offset motion assembly is provided for moving the reciprocating blades alternately upstream and downstream into linearly-offset cutting and non-cutting positions relative to the stock. An electronic controller such as an encoder is provided for coordinating the reciprocating movement of the blades and the linear offset motion of the blades to thereby permit continuous movement of the stock while the blades are in both the cutting and non-cutting positions and strokes.

4 Claims, 3 Drawing Sheets

FRAME SAW APPARATUS AND METHOD

This is a divisional application of U.S. patent application Ser. No. 10/068,122, filed Feb. 5, 2002, now U.S. Pat. No. 6,698,327.

TECHNICAL FIELD AND BACKGROUND OF THE INVENTION

This invention relates to a frame saw and a method of simultaneously sawing a relatively thick piece of wood, referred to as the "feed stock", into a plurality of thinner pieces suitable for use as veneer, lattice, window louvers or slats, and as the plies of engineered three-ply flooring.

In general, frame saws accomplish this by mounting a plurality of saw blades within a frame. The blades are parallel to each other and spaced apart by the desired thickness of the sawn thinner pieces. The thickness of the blades themselves represents wastage, so the blades are made to be as thin as possible and are held within the frame under tension sufficient to maintain the blades in a straight, taut condition at all times. The blades are reciprocated rapidly up and down. These blades have teeth which are angled to cut on the downstroke, the feed stock being supported on a feed table. No cutting takes place on the upstroke. Thus, in prior art frame saws the movement of the feed stock must be stopped during the upward, non-cutting stroke, otherwise the face of cuts would bear against and damage or break the blades. This requires a mechanism timed to the reciprocation of the blades to continuously start and stop the movement of the feed stock in timed relation with the reciprocation of the blades. When the blades are moving downwardly in the cutting stroke the stock is being fed. When the blades are being reciprocated upwardly into the position to begin the next downward cutting stroke, the stock is stationary.

This arrangement requires a complicated mechanism which reduces the efficiency of the machine and the quality of the processed stock. If the feed stock is still moving during any part of the upstroke the back side of the saw teeth can damage the feed stock, and can be damaged by contact with the feed stock at the face of the last cut.

The present invention provides an efficient, electronic means of permitting the stock to be continuously fed through the frame saw apparatus, thus eliminating the costly and inefficient necessity to constantly start and stop the movement of the stock during each reciprocation. In general, this is accomplished by moving the saw frame carriage carrying the saw blades downstream during the non-cutting upstroke and moving the saw blades upstream during the cutting downstroke. The upstream movement of the blades and the downstream movement of the stock permits a deeper cut during each reciprocation of the saw frame carriage.

SUMMARY OF THE INVENTION

Therefore, it is an object of the invention to provide a frame saw apparatus which allows continuous travel of the feed stock through the frame saw apparatus.

It is another object of the invention to provide a frame saw apparatus which permits an increased depth of cut during each cutting stroke.

It is another object of the invention to provide a frame saw apparatus produces a feed stock product more efficiently and at a higher quality.

These and other objects of the present invention are achieved in the preferred embodiments disclosed below by providing a frame saw for sawing a relatively thick piece of wooden feed stock simultaneously into a plurality of thinner pieces of wood, and comprising a feed assembly for continuously feeding the stock from an upstream input position to a downstream output position, and a plurality of closely spaced-apart parallel reciprocable saw blades positioned intermediate the input position and the output position for sawing the stock into thinner pieces of stock as the stock is moved by the feed assembly relative to the blades. A drive assembly is operatively connected to the blades for driving the blades in a reciprocating motion comprising alternate cutting and non-cutting strokes. A linear offset motion assembly is provided for moving the reciprocating blades alternately upstream and downstream into linearly-offset cutting and non-cutting positions relative to the stock. Control means are provided for coordinating the reciprocating movement of the blades and the linear offset motion of the blades to thereby permit continuous movement of the stock while the blades are in both the cutting and non-cutting positions and strokes.

According to one preferred embodiment of the invention, the control means comprises an encoder for determining the reciprocation position of the blades, and a servo- motor responsive to position signals received from the encoder for moving the linear offset motion assembly linearly in timed relationship with the reciprocation of the blades.

According to another preferred embodiment of the invention, the saw blades reciprocate vertically between a cutting downstroke and a non-cutting upstroke.

According to yet another preferred embodiment of the invention, the linear offset motion assembly moves the saw blades linearly downstream away from the moving stock during the non-cutting stroke of the blades.

According to yet another preferred embodiment of the invention, a saw frame carriage is provided within which the saw blades are carried for reciprocation.

According to yet another preferred embodiment of the invention, the linear offset motion assembly includes first and second carriage arm assemblies connected to the saw frame carriage for pivotal movement with the reciprocation of the saw blades about respective pivot points, and the servo-motor moves the saw frame carriage alternately upstream and downstream into linearly-offset cutting and non-cutting positions relative to the stock by linearly moving the pivot points of the respective carriage arms in coordination with the reciprocating movement of the frame saw carriage.

According to yet another preferred embodiment of the invention, the carriage arm pivots are defined by respective pivot blocks mounted for linear movement.

According to yet another preferred embodiment of the invention, the pivot blocks are connected together by a connecting rod for unison movement.

According to one preferred embodiment of the invention, a frame saw is provided for sawing a relatively thick piece of wooden feed stock simultaneously into a plurality of thinner pieces of wood, and comprises a feed assembly for continuously feeding the stock from an upstream input position to a downstream output position, and a plurality of closely spaced-apart, parallel and vertically-reciprocable saw blades carried in a saw frame carriage positioned intermediate the input position and the output position for sawing the stock into thinner pieces of stock as the stock is moved by the feed assembly relative to the blades. The saw blades have teeth thereon angled to cut the stock on a cutting downstroke of the saw frame carriage. A drive motor is operatively connected to the saw frame carriage for driving the blades carried in the saw frame carriage in a reciprocating motion comprising alternate downward cutting and upward non-cutting strokes. A linear offset motion assembly is provided for moving the saw frame carriage alternately upstream and downstream into linearly-offset cutting and non-cutting positions relative to the stock.

Control means are provided for coordinating the reciprocating movement of the saw frame carriage and the linear offset motion of the saw frame carriage to thereby permit continuous movement of the stock while the blades are in both the cutting and non-cutting positions and strokes. The control means comprises an encoder for determining the reciprocation position of the saw frame carriage, and a servo device responsive to position signals received from the encoder for moving the linear offset motion assembly linearly in timed relationship with the reciprocation of the saw frame carriage.

According to yet another preferred embodiment of the invention, the servo device comprises a servo-motor and a rotary-to-linear motion apparatus for translating rotary motion of the servo-motor into a corresponding linear motion of the linear offset motion assembly.

Preferably, the rotary-to-linear motion apparatus comprises a ball screw assembly.

An embodiment of the method of sawing a relatively thick piece of wooden feed stock into thinner pieces according to the invention comprises the steps of continuously feeding the stock from an upstream input position to a downstream output position while simultaneously sawing the stock into a plurality of thinner pieces of stock as the stock is fed relative to the blades by driving the blades in a reciprocating motion comprising alternate cutting and non-cutting strokes. The reciprocating blades are moved alternately upstream and downstream into linearly-offset cutting and non-cutting positions relative to the stock. The reciprocating movement of the blades and the linear offset motion of the blades is coordinated to thereby permit continuous movement of the stock while the blades are in both the cutting and non-cutting positions and strokes.

According to yet another preferred embodiment of the invention, the method includes the steps of determining the reciprocation position of the blades, and moving the linear offset motion assembly linearly in timed relationship with the reciprocation of the blades.

According to yet another preferred embodiment of the invention, the step of reciprocating the blades comprises the step of reciprocating the blades vertically between a cutting downstroke and a non-cutting upstroke.

According to yet another preferred embodiment of the invention, the saw blades move linearly downstream away from the moving stock during the non-cutting stroke of the blades.

According to yet another preferred embodiment of the invention, the depth of cut of a single cutting stroke of the blades is equal to the sum of the downstream travel of the feed stock during the cutting stroke and the linear upstream travel of the blades from the non-cutting to the cutting position.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
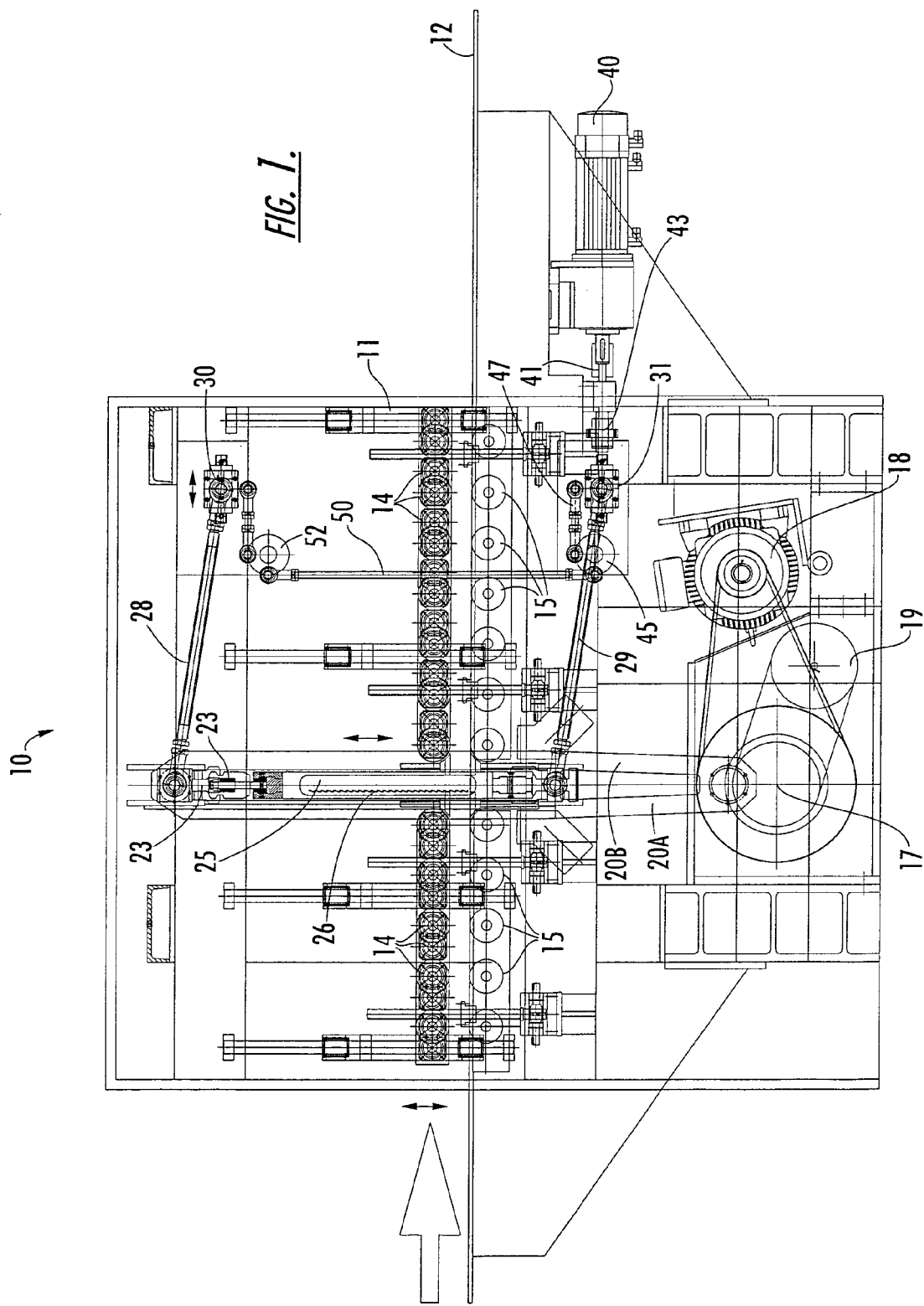
FIG. 1 is a vertical cross-section of a frame saw according to an embodiment of the invention.
Figure 2:
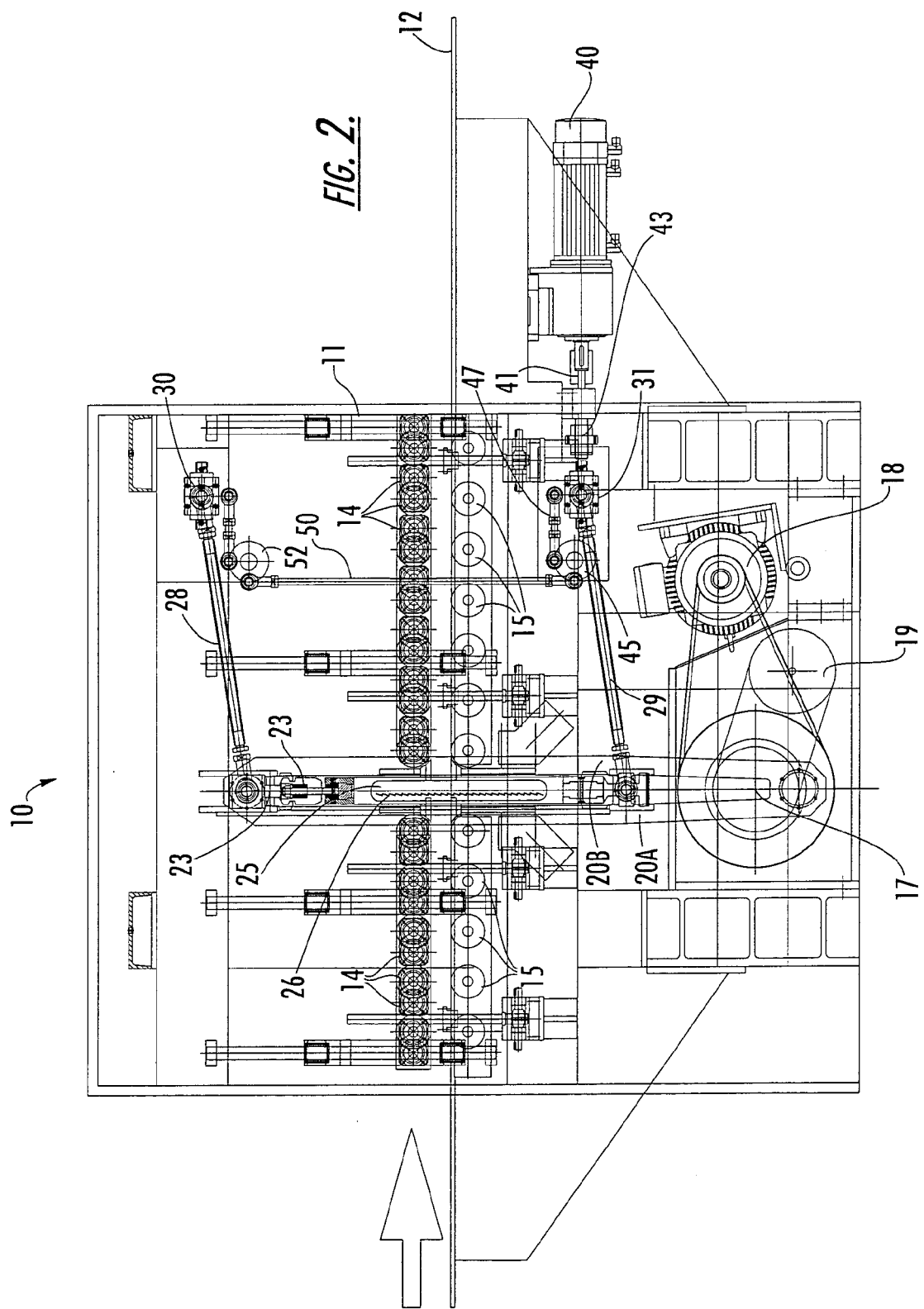
FIG. 2 is a vertical cross-section according to FIG. 1 with the saw frame carriage arms in the downward position at the end of the cutting stoke.
Figure 3:
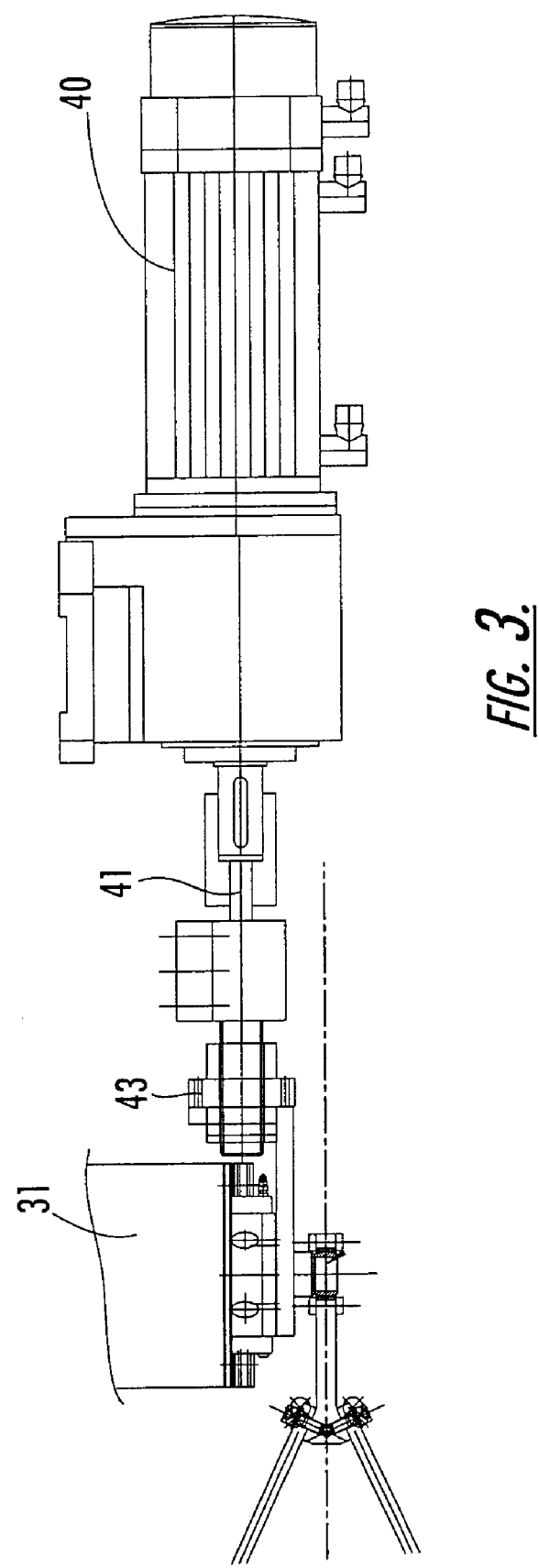
FIG. 3 is a fragmentary top plan view of the servo-motor, ball screw assembly and adjacent parts of the linear guide pivot block.

Referring now specifically to the drawings, a frame saw according to the present invention is illustrated in FIG. 1 and shown generally at reference numeral 10. The frame saw 10 includes a machine frame 11 to which the other machine elements are mounted in a conventional manner.

A feed table 12 extends horizontally through the machine frame 11 from an upstream side to a downstream side of the frame saw 10, as indicated by the direction arrow shown on the upstream side of the frame saw 10 and indicating the direction of movement. A feed stock (not shown) is fed from an input position on the upstream side on the feed table to the output position on the downstream side. The feed stock is driven through the frame saw 10 by drive roller assemblies 14 and 15. The drive roller assemblies 14 bear on the top surface of the feed stock and keep it securely on the feed table 12. The drive roller assemblies 14 are vertically adjustable to accommodate the thickness of the feed stock.

A crank shaft 17 is mounted near the lower extent of the frame saw 10 and is driven by an electric motor 18. An electronic encoder 19 is driven by the crank shaft 17 and outputs a digital signal indicative of the rotational position of the crank shaft 17 at any point in time. Encoder 19 is capable of providing extremely precise real time positional information, the utility of which is explained below.

Two crank shaft arms 20A, 20B are eccentrically mounted at a single pivot point to the crank shaft 17. Rotational movement of the crank shaft 17 thus causes the crank shaft arms 20A, 20B to reciprocate upwardly and downwardly once during each revolution of the crank shaft 17. A saw frame carriage 23 is mounted between the crank shaft arms 20A, 20B for reciprocation with the crank shaft arms 20A, 20B. A saw frame 25 is carried by the saw frame carriage 23 and contains a plurality of closely-spaced apart and parallel saw blades 26, the teeth of which are angled downwardly to cut on each downstroke.

Were the frame saw carriage 23 to move only with a vertical component of movement, it would be necessary to stop the movement of the feed stock during each non-cutting upstroke. Otherwise, the blades 26 would bind against the face of the cut, damaging both the stock and the blades 26. A pair of laterally-spaced upper carriage arms 28 and a pair of lower carriage arms 29 are attached to the saw frame carriage 23 on opposite ends thereof and pivot as the saw frame carriage 23 reciprocates upwardly and downwardly. The pairs of upper carriage arms 28 and lower carriage arms 29 converge on and pivot about points defined by a respective centrally-disposed upper linear guide pivot block 30 and a lower linear guide block 31.

The pivot blocks 30 and 31 are each mounted on slide rods, for example, a product referred to as a Thompson rail. Thus, the pivot blocks 30, 31 and the pivot points defined by these assemblies are capable of moving linearly, defined as straight-line movement in the same direction as the feed stock through the frame saw 10.

The timing of movement of the pivot blocks 30, 31 is controlled by encoder 19. Encoder 19, determines very precisely the position of a reference point on the crank shaft 17 at any point in time. The encoder 19 preferably comprises an electronic device but may be of the type comprising a light source such as a light emitting diode, a photocell and a slotted disk between the light source and the photocell. The reference point is correlated to the position of the saw frame carriage 23 and thus the saw blades 26. A digital signal representing the position is electronically conveyed to a servo-motor 40. The servo-motor 40 is capable of making extremely fast, precise and small angular movements. The servo-motor 40 may likewise may be a stepper motor or other motor which moves a prescribed angular distance or to a prescribed angular location upon command. The output shaft 41 of the servo-motor 40 is connected to a ball screw assembly 43. The ball screw assembly 43 outputs a linear movement corresponding to the magnitude and direction of rotary movement of the output shaft 41 of the servo-motor 40.

The ball screw assembly 43 is connected to the linear guide pivot block 31 and thus transfer this linear movement to the pivot block 31, which moves linearly along the guide rod. A cam 45 is connected eccentrically to the lower carriage arm 29 and arm 47 carried by the linear guide pivot block 31. The linear movement of the linear guide pivot block 31 is thus converted into movement of the cam 45 and of the attached lower carriage arms 29.

The linear motion of the lower carriage arms 29 is transferred to the upper carriage arms 28 by a connecting rod 50 connected to a respective cam 52, which is also connected to the upper linear guide pivot block 30.

As is apparent from the foregoing, the pairs of upper and lower carriage arms 28 and 29 thus pivot in unison by reason of their attachment to the saw frame carriage 23 and move linearly in unison by reason of the attachment arrangement described immediately above. As the saw frame carriage 23 nears the bottom of the cutting downstroke, the encoder 19 transmits a signal to the servo-motor 40, initiating a movement of the output shaft 41 which is translated into a rearward movement of the linear guide pivot blocks 30 and 31. This has the effect of moving the saw frame carriage 23 in a linear direction downstream as the feed stock continues moving downstream. The downstream movement of the saw frame carriage 23 continues as the saw frame carriage 23 changes direction and moves upwardly during the non-cutting stroke into position to begin the next cutting downstroke. The approach of the saw frame carriage 23 to the uppermost extent of the non-cutting stroke is detected by the encoder 19 and a signal is transmitted to the servo-motor 40 indicative of this movement. The servo-motor 40 moves the saw frame carriage 23 in a linear direction upstream as the feed stock continues moving downstream. The upstream movement of the saw frame carriage 23 continues as the saw frame carriage 23 changes direction and moves downwardly during the cutting stroke.

As is well known, the encoder signals and movements of the servo-motor 40 are controlled by software which takes into account and anticipates the required motions as necessary to compensate for transmission time, machine part slippage and motion initiation intervals caused by, for example, motor and drive element inertia.

A frame saw is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A method of sawing a relatively thick piece of wooden feed stock simultaneously into a plurality of thinner pieces of wood, comprising the steps of:
   (a) continuously feeding the stock from an upstream input position to a downstream output position;
   (b) simultaneously sawing the stock into a plurality of thinner pieces of stock as the stock is fed relative to a plurality of parallel blades by driving the blades in a reciprocating motion comprising alternate cutting and non-cutting strokes;
   (c) moving the reciprocating blades-alternately upstream and downstream into linearly-offset cutting and non-cutting positions relative to the stock; and
   (d) coordinating the reciprocating movement of the blades and the linear offset motion of the blades to thereby permit continuous movement of the stock while the blades are in both the cutting and non-cutting positions and strokes, said coordinating step including:
     (i) determining the reciprocation position of the blades; and
     (ii) moving a linear offset motion assembly which is connected to said blades linearly in timed relationship with the reciprocation of the blades.

2. A method according to claim 1, wherein the step of reciprocating the blades comprises the step of reciprocating the blades vertically between a cutting downstroke and a non-cutting upstroke.

3. A method according to claim 2, wherein the saw blades move linearly downstream away from the moving stock during the non-cutting stroke of the blades.

4. A method according to claim 1, wherein the depth of cut of a single cutting stroke of the blades is equal to the sum of the downstream travel of the feed stock during the cutting stroke and the linear upstream travel of the blades from the non-cutting to the cutting position.

* * * * *